United States Patent
Bögelsack

(10) Patent No.: US 8,195,223 B2
(45) Date of Patent: Jun. 5, 2012

(54) METHOD AND DEVICE FOR CONTROLLING BILATERAL COMMUNICATION SYSTEM AND RADIO TRANSMISSION

(75) Inventor: Martin Bögelsack, Bergfelde (DE)

(73) Assignee: T-Mobile International AG & Co. KG, Bonn (DE)

( * ) Notice: Subject to any disclaimer, the term of this patent is extended or adjusted under 35 U.S.C. 154(b) by 1028 days.

(21) Appl. No.: 11/908,233

(22) PCT Filed: Mar. 7, 2006

(86) PCT No.: PCT/EP2006/002047
§ 371 (c)(1),
(2), (4) Date: Jan. 15, 2008

(87) PCT Pub. No.: WO2006/094750
PCT Pub. Date: Sep. 14, 2006

(65) Prior Publication Data
US 2008/0166982 A1    Jul. 10, 2008

(30) Foreign Application Priority Data

Mar. 9, 2005    (DE) .......................... 10 2005 011 214

(51) Int. Cl.
*H04M 1/00* (2006.01)
(52) U.S. Cl. ...................... 455/552.1; 455/426.1; 455/84
(58) Field of Classification Search ............... 455/426.1, 455/500, 502, 507, 524, 84, 550.1, 552.1, 455/553.1, 556.1, 161.2, 179.1, 183.2, 41.2
See application file for complete search history.

(56) References Cited

U.S. PATENT DOCUMENTS

| | | | | |
|---|---|---|---|---|
| 2003/0069032 A1* | 4/2003 | Jarvi et al. | | 455/466 |
| 2004/0127192 A1 | 7/2004 | Ceresoli et al. | | |
| 2004/0203406 A1* | 10/2004 | Moran et al. | | 455/66.1 |
| 2005/0043020 A1* | 2/2005 | Lipsanen et al. | | 455/422.1 |

FOREIGN PATENT DOCUMENTS

| | | |
|---|---|---|
| DE | 20 2004 005 574 | 8/2004 |
| EP | 1 450 503 | 8/2004 |
| EP | 1 494 479 | 1/2005 |
| GB | 2 396 228 | 6/2004 |
| JP | 2002-369168 | 12/2002 |
| JP | 2003-092556 | 3/2003 |
| JP | 2004-215219 | 7/2004 |
| KR | 10 2004 0041627 | 5/2004 |

(Continued)

OTHER PUBLICATIONS

K. Hamada, "Prototype Mobile Phone Capable of Receiving and Collaborating with Terrestrial Digital TV Broadcasting". In: International conference on Consumer Electronics (ICCE), Jan. 8-12, 2005. Digest of Technical Papers. Pages 455-456. (Cited in Office Action dated Nov. 17, 2005 in German application No. 10 2005 011 214.5).

(Continued)

*Primary Examiner* — Ping Hsieh
(74) *Attorney, Agent, or Firm* — Faegre Baker Daniels LLP

(57) ABSTRACT

The invention relates to a control module in telecommunications end devices, in particular in mobile telephones, that enables a two-way control of the mobile radio unit and the broadcast unit.
Additionally, setting information from the entire system can also be transferred over control channels.

15 Claims, 3 Drawing Sheets

FOREIGN PATENT DOCUMENTS

| WO | 01/17255 | 8/2001 |
|----|----------|--------|
| WO | WO 03/032500 | 4/2003 |
| WO | 03/045064 | 5/2003 |
| WO | 2004/040876 | 5/2004 |
| WO | 2004/102845 | 11/2004 |

OTHER PUBLICATIONS

U. Horn, et al.: "Interactive Mobile Streaming Services—the convergence of broadcast and mobile communication", EBU review—Technical, European Broadcasting Union. Brussells, BE. Sep. 1999. (Cited in an International Search Report dated Jun. 30, 2006 in PCT/EP2006/002047, previously submitted).

Office Action dated Nov. 17, 2005 in German Application No. 10 2005 011 214.5 together with an English language translation of Office Action.

English language abstract together with foreign patent document.

Office Action dated Jul. 31, 2008 in corresponding European Application No. 06 723 247.0 and English language translation of same.

Examination Report dated Dec. 16, 2010 in corresponding German Application No. 10 2005 214.5 and English language translation of the same.

Office Action dated Aug. 31, 2011 in corresponding Korean Patent Application No. 10-2007-7022774.

Translation of Office Action dated Jul. 15, 2011 in corresponding Japanese Application No. 2008-500107.

Notification dated Sep. 19, 2011 in corresponding German Application No. 10 2005 011 214.5.

\* cited by examiner

METHOD AND DEVICE FOR CONTROLLING BILATERAL COMMUNICATION SYSTEM AND RADIO TRANSMISSION

CROSS-REFERENCE TO RELATED APPLICATION

This application is related to and claims the benefit under 35 U.S.C. §119 and 35 U.S.C. §365 of International Application No. PCT/EP2006/002047, filed Mar. 7, 2006.

The invention relates to the control in systems of devices, which incorporate bilateral (mobile) communication and broadcasting, in particular mobile phones and handheld computers.

Mobile telephones, PDAs and mobile computers with receiving capabilities for data streams that are broadcast over radio channels currently have separate devices that cannot control each other. The operator either operates the mobile radio part or the radio part (broadcast part). A query of the respective other settings or an active access to the respective other system is not possible.

Indeed, the MHP specification provides an interworking between two systems on a high level. However, this does not involve the setting parameters of the respective other system; the specification can also not be used on mobile devices.

The object of the present invention idea is how to provide a control unit in the initially named devices that enables a two-way control of the mobile radio and radio unit as well as a transfer of information via the setting parameters of the two named units.

This object is solved in accordance with the invention through the technical doctrine of the independent patent claims, the content of which we now refer to.

Advantageous embodiments and improvements of the invention result from the dependent patent claims, the content of which we now refer to.

The problem is solved in that a control module is provided in the telecommunications end device, whereby the control module is connected with both the mobile radio unit as well as with the radio unit. By means of this control module, it is possible in accordance with the invention that the set radio channel is communicated via a mobile radio control channel to the supplier of the radio program content (service provider) in a data record, which e.g. consists of the device type, the telephone number and the radio channel segment.

This function can be switched off and can be controlled by the customer. It is thus possible to comply with data protection requirements. It is also possible to set a radio channel or a radio segment via the mobile radio control channel.

An important advantage of the present invention idea is the creation or improvement of the control option of a telecommunications end device with built-in radio receiving device, whereby the radio reception either takes place via the telecommunication network or through the usual high frequency transmission.

The present invention is explained in greater detail based on the attached figures, whereby these also result in characteristics according to the invention from the combination of the individual characteristics.

The figures show the following.

The description of a possible implementation of the invention idea is listed below as an example.

A sample application from the point of view of the user is first described and then the processes in the end device.

Figure 1:
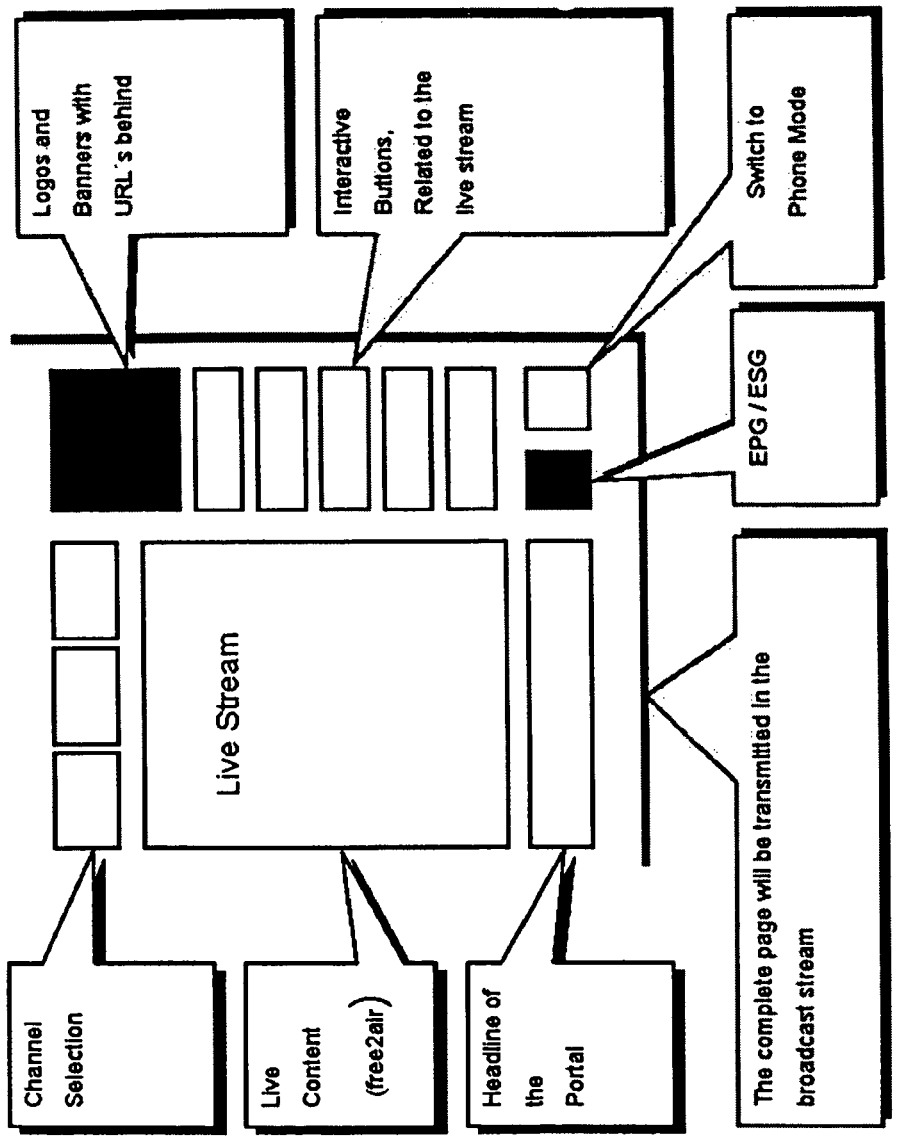
FIG. 1 shows an example of a start page of a mobile radio end device that appears after the activation of the radio part.

FIG. 1 shows an example of a start page that appears after the activation of the radio part. It is a typical user interface for detecting a "broadcast-enabled" mobile telephone. The interface shown has setting options both for the (data) radio part and for the part that interactively establishes data connections via (data) mobile radio to a portal, a website, etc.

In the middle of the left half of the screen, the screen is for generally accessible, so-called "free to air" content (Live Content free2air). The line above this shows information on the set receive channel (channel selection). The bottom edge of the screen shows information on the portal, via which the information is being transmitted (headline of the portal).

The top corner of the right half includes a field for displaying logos or similar information. Several interactive interfaces (interactive buttons) that the user can use to enter data are arranged below this. At the bottom, there is also a small field for an electronic program directory (EPG/ESG); there is an interactive interface for switching to mobile radio mode in the bottom right corner.

Figure 2:
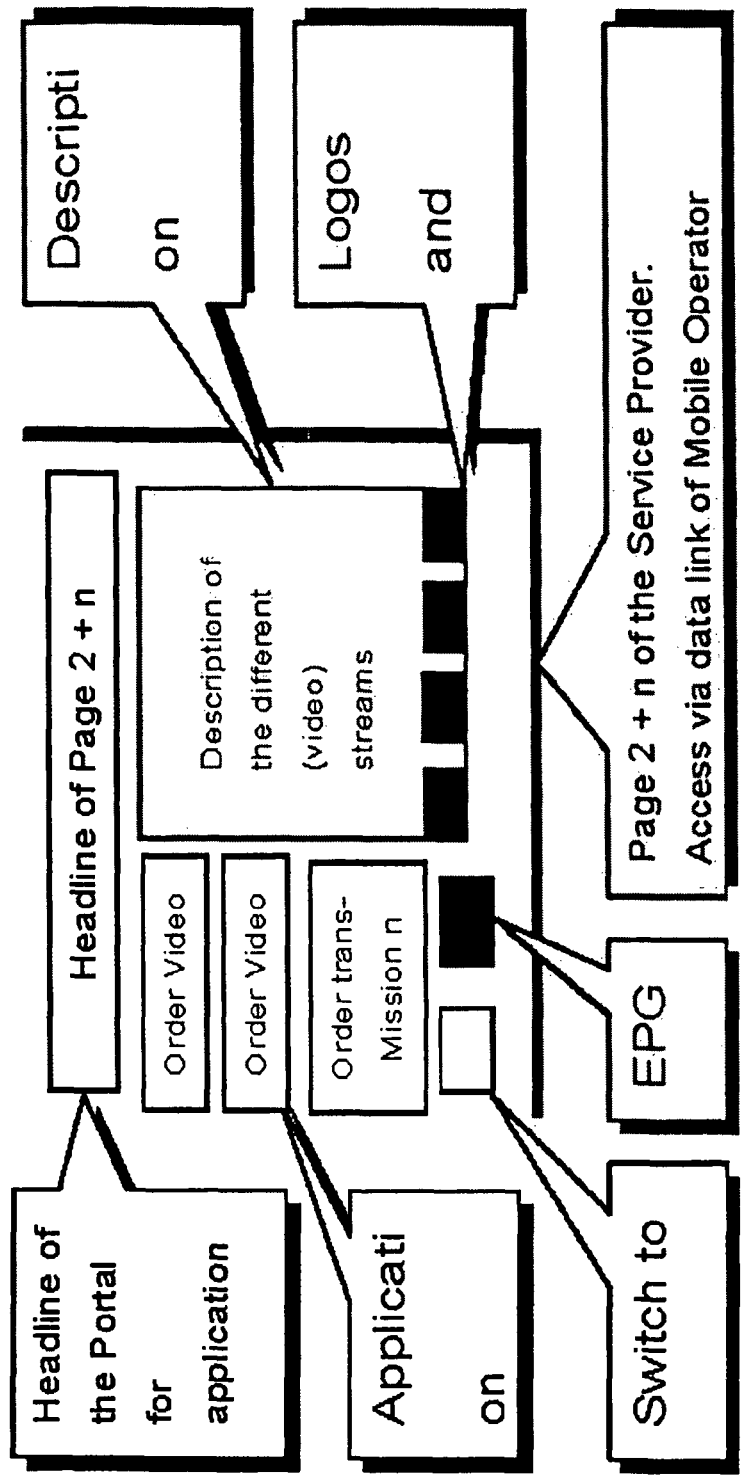
FIG. 2 shows an example of a user interface in the portal access operating type via a mobile radio channel.

FIG. 2 shows an example of a user interface in the portal access operation type via a mobile radio channel.

The picture shows a typical application interface for a portal access of a convergent service provider. The customer is located on a page that submits the represented offers to him. The display of the program offer takes up a considerable amount of space. From this offer, the customer can order certain content (videos, files, web content), which is then offered to him at the start of the transmission if the content is available. The user receives a "push notification" that contains the decrypt key and the setting parameters for the broadcast part.

Figure 3:
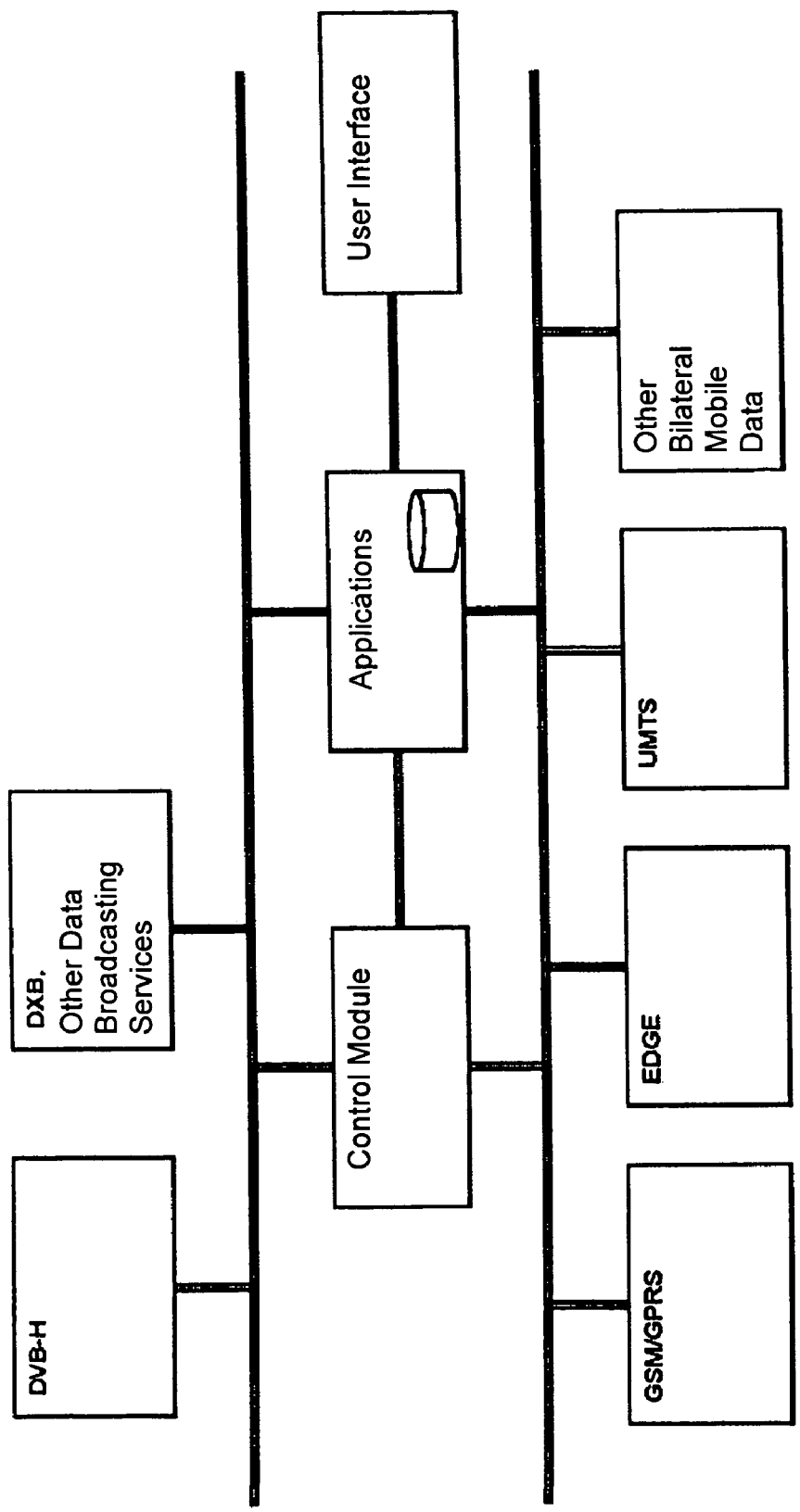
FIG. 3 shows the constellation of the control module according to the invention in connection with the mobile radio and radio units of a corresponding telecommunications end device.

FIG. 3 shows how the control module according to the invention is linked with the other components of the telecommunication end device. The control module is on one hand connected with the one or more radio units that transmit the content in accordance with different standards. DVB-H stands for Digital Video Broadcast for Handhelds, DAB for Digital Audio Broadcast, etc.

On the mobile radio side, bidirectional units, i.e. send/receive units, are provided in accordance with the respective established and/or available transfer standard. GSM/GPRS means a unit for communication in accordance with the currently prevalent digital standard with the data transfer variant GPRS. UMTS is the recently introduced Universal Mobile Telecommunication System, EDGE the "Enhanced Data Rates for Global Evolution."

The invention is not bound to known radio or mobile radio standards, but rather works with all current and future systems.

By means of a bus system, the control module according to the invention is now connected on one hand to the radio unit(s), on the other hand to the mobile radio unit(s) and also to a unit that contains the corresponding application programs and electronic data processing components. The interface to the user is then established via a corresponding user interface.

The control module according to the invention gets the settings and queries from the radio part and the mobile radio part and combines this meaningfully with the selected application(s).

The core of the invention is the linking of previously separately operated systems—radio receive device and mobile unit—in one telecommunications end device.

The subject matter of the present invention not only results from the subject matter of the individual patent claims but also from the combination of the individual patent claims.

All information and characteristics disclosed in the documents including the summary, in particular the expanded illustration shown in the drawings, are claimed as important to the disclosed embodiment of the invention inasmuch as they are new individually or in combination with the current state of the art.

LIST OF REFERENCES AND ABBREVIATIONS

DVB-H Digital Video Broadcast for Handhelds
DXB Generic term for DAB and DVB
EDGE Enhanced Data Rates for Global Evolution (Data transfer standard in the GSM system, based on 8PSK modulation, user data rates of up to 553.6 kbps are possible)
EPG Electronic Program Guide
ESG Electronic Service Guide
GPRS GSM Packet Radio System
GSM Global System for Mobile Communications
Live Stream Real-time data transfer without intermediate storage
MHP Multimedia Home Platform
PDA Personal Digital Assistant
Portal Internet address with access to content saved on a server
Service Provider Service providers
UMTS Universal Mobile Telecommunications System
URL Internet address

The invention claimed is:

1. A control module connected to a telecommunications end device, the telecommunications end device including a first bidirectional mobile radio communication unit that serves to communicate with public and/or private communication networks and at least one second radio broadcast communication unit that serves to receive data broadcasts, the control module connected to both said first bidirectional mobile radio communication unit and said second radio communication unit; said second radio communication unit adapted to receive broadcast radio program content from a supplier over a channel set in the second radio communication unit; the control module transferring between the first and second communication units at least one data signal assigned to a control parameter; the control module starting a mobile radio communication directly within an application of a radio data stream; the control module obtaining from the second radio communication unit the radio channel set therein and communicating in a data record the radio channel set in the second radio communication unit via a mobile radio control channel to the supplier of radio program content; by means of the control module a radio channel on a radio segment can be set in the end device through the mobile radio control channel, wherein in the event of a first instance of a received query from the service provider, information on set receive channels in the second radio unit is transmitted using control channels or other data channels at this first instance.

2. The control module connected to a telecommunications end device in accordance with claim 1, wherein the control module is arranged as a concentrated unit in the telecommunications end device.

3. The control module connected to a telecommunications end device in accordance with claim 2, comprising: the control module providing information on at least one setting parameter of the first mobile unit and/or the second radio unit via one or more control channels, a mobile radio connection being started by the user directly from within a single application of a radio data stream by means of the control module.

4. The control module connected to a telecommunication end device in accordance with claim 1, wherein the control module is arranged distributed in the telecommunications end device.

5. The control module connected to a telecommunications end device in accordance with claim 4, comprising: the control module providing information on at least one setting parameter of the first mobile unit and/or the second radio unit via one or more control channels, a mobile radio connection being started by the user directly from within a single application of a radio data stream by means of the control module.

6. The control module connected to a telecommunications end device in accordance with claim 1, comprising: the control module providing information on at least one setting parameter of the first mobile unit and/or the second radio unit via one or more control channels, a mobile radio connection being started by the user directly from within a single application of a radio data stream by means of the control module.

7. The control module connected to a telecommunications end device in accordance with claim 6, wherein when queries are received information on set parameters in the second radio unit is transmitted after release, through the user, using control channels or other data channels to the service provider (push mode).

8. The control module connected to a telecommunications end device in accordance with claim 1, wherein said data record comprises the end device type, the telephone number of the end device and a radio channel segment.

9. A method for the operation of a telecommunications end device including a first bidirectional mobile radio communication unit that serves to communicate with public and/or private communication networks and at least one second radio broadcast communication unit that serves to receive data broadcasts, the control module connected to both said first bidirectional mobile radio communication unit and said second radio communication unit; the second radio communication unit adapted to receive broadcast radio program content from a supplier over a channel set in the second radio communication unit; the control unit transferring between the first and second communication units at least one data signal assigned to a control parameter and starting a radio communication directly within an application of a radio data stream; the control module obtaining from the second radio communication unit the radio channel set therein and communicating in a data record the radio channel set in the second radio communication unit via a mobile radio control channel to the supplier of radio program content; by means of the control module, setting in the end device a radio channel or a radio segment through the mobile radio control channel, wherein in the event of a first instance of a received query from the service provider, information on set receive channels in the second radio unit is transmitted using control channels or other data channels at this first instance.

10. The method of claim 9, wherein said data record comprises the end device type, the telephone number of the end device and a radio channel segment.

11. The method of claim 9, wherein the control module is arranged as a concentrated unit in the telecommunications end device.

12. The method of claim 9, wherein the control module is arranged distributed in the telecommunications end device.

13. The method of claim 9, wherein the control module provides information on at least one second parameter of the first mobile unit and/or the second radio unit via one or more control channels, and a mobile radio connection is started by the user directly from within a single application of the radio data stream by means of the control module.

14. A method for the operation of a telecommunications end device in accordance with claim 11, comprising: the control module providing information on at least one setting parameter of the first mobile unit and/or the second radio unit via one or more control channels, a mobile radio connection being started by the user directly from within a single application of a radio data stream by means of the control module.

15. A method for the operation of a telecommunications end device in accordance with claim 12, comprising: the control module providing information on at least one setting parameter of the first mobile unit and/or the second radio unit via one or more control channels, a mobile radio connection being started by the user directly from within a single application of a radio data stream by means of the control module.

* * * * *